United States Patent Office.

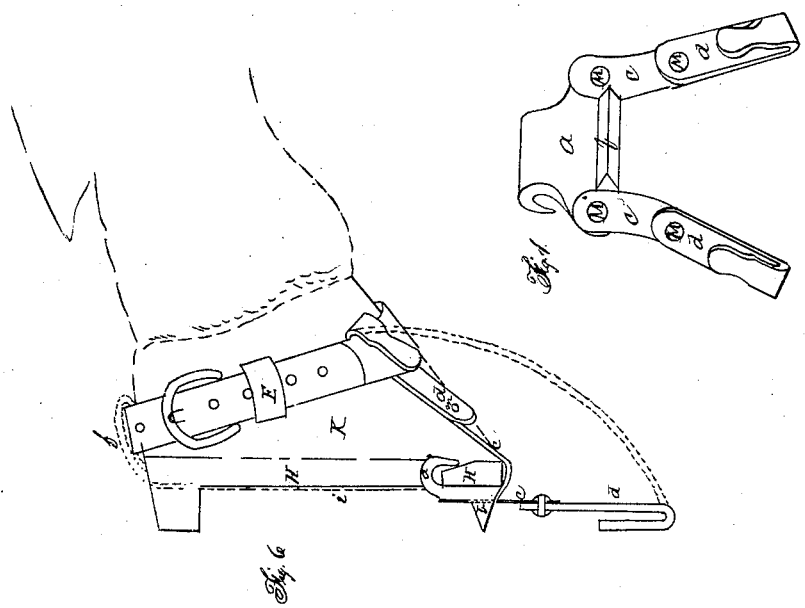
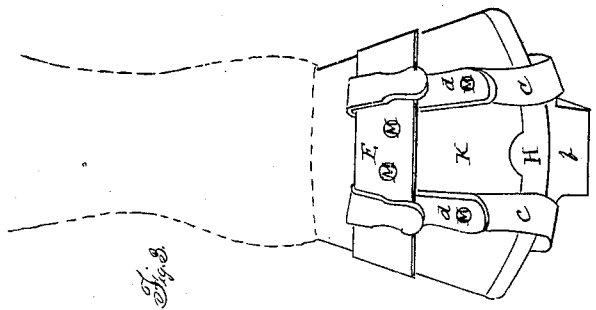
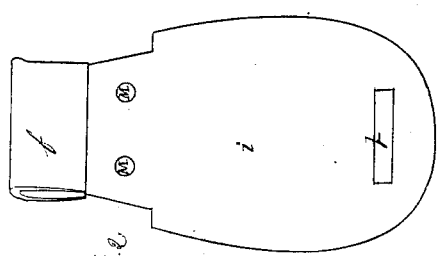

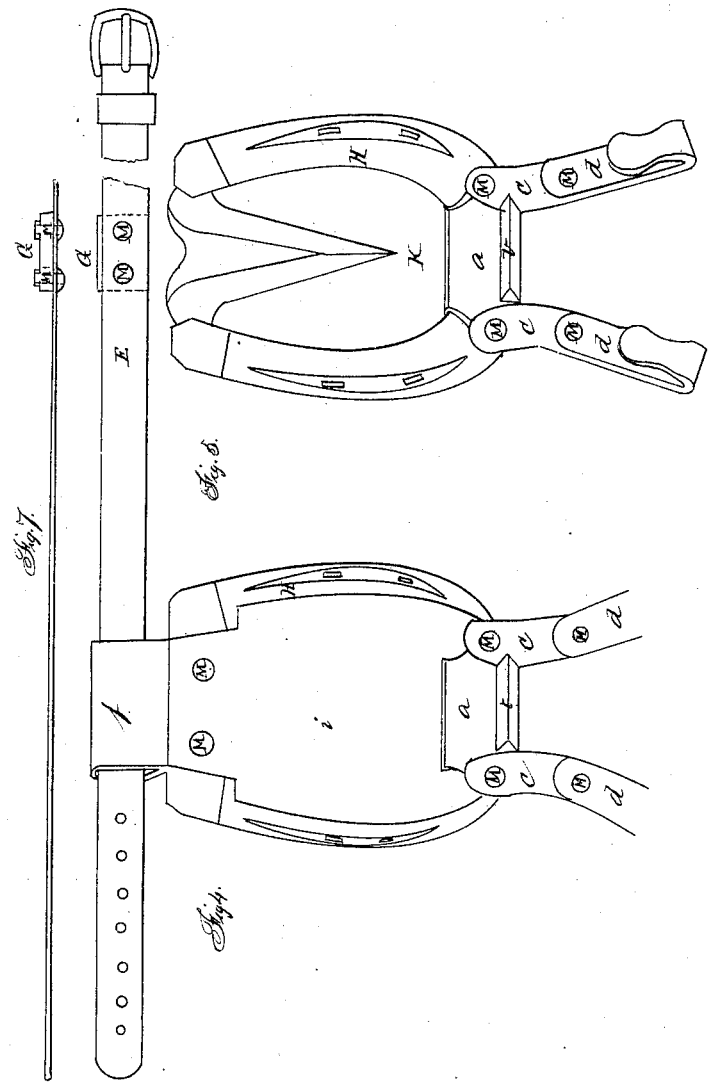

WILLIAM T. HARMAR, OF NEW YORK, N. Y.

Letters Patent No. 73,971, dated February 4, 1868.

IMPROVEMENT IN HORSE-SHOES.

*The Schedule referred to in these Letters Patent and making part of the same.*

TO ALL WHOM IT MAY CONCERN:

I, WILLIAM T. HARMAR, of the city, county, and State of New York, have invented a new and useful device, viz, a Steel Toe-Cork or Sharp, attachable to any smooth horse-shoe by means of a clip, flexible metal strap, lever-hooks, and leather strap, with stop, such as represented; also an iron (or other metal) snow-plate, attachable to the shoe by means of the clip and hole and leather loop and strap, as represented in the plan hereunto annexed; and I do hereby declare that the following is a full and exact description of the same, reference being had to the accompanying drawings, and the letters of reference marked thereon.

Figure 1 represents the steel shoe-sharp or point, with clip for fastening it to the shoe, flexible iron (or other metal) strap, and iron lever-hook.

Figure 2 represents the iron (or other metal) snow-plate, with square hole and leather loop.

Figure 3 represents the horse's hoof with shoe, and shoe-sharp fastened thereto.

Figure 4 represents the bottom of the hoof with shoe, toe-cork or sharp, and snow-plate attached; also leather loop and strap.

Figure 5 represents the bottom of the hoof, with shoe and sharp, without snow-plate.

Figure 6 represents a side view of hoof and section of shoe and sharp, showing the manner of fastening it to the shoe and hoof.

Figure 7 represents a section of the strap with leather stop.

Letter A, figs. 1, 4, 5, and 6, represents the clip, made of soft iron, to which the toe-cork or sharp is welded, griping under the toe of the shoe close to the hoof.

Letter B, figs. 1, 3, 4, 5, and 6, represents the toe-cork or sharp, of steel, welded to the clip.

Letter C, figs. 1, 3, 4, 5, and 6, represents a flexible strap, of Norway iron or other soft, tenacious metal, fastened to the clip with a rivet capable of being bent, without breaking, when the sharp is fastened or loosened from the shoe, and when thus fastened it closely hugs the hoof.

Letter D, figs. 1, 3, 4, 5, and 6, represents an iron lever-hook, riveted to the flexible strap, and made of strong, hard iron, for the purpose of receiving the leather strap, and thus securing the toe-cork or sharp to the hoof.

Letter E, figs. 3, 4, and 6, represents a leather strap, with buckle and stop, used for the purpose of fastening the snow-plate and toe-cork or sharp to the hoof, by spanning the same.

Letter F, figs. 2, 4, and 6, represents a leather loop riveted to the heel of the snow-plate, for the purpose of admitting the leather strap through it, so as to hold it to the hoof.

Letter G, figs. 4 and 7, represents a leather stop riveted to the strap, for the purpose of keeping the lever-hooks in their proper places, and preventing the leather strap from sliding on the hoof.

Letter H, figs. 3, 4, 5, and 6, represents the horse-shoe.

Letter I, figs. 2, 4, and 6, represents the snow-plate, of iron or other metal.

Letter K, figs. 3, 5, and 6, represents the hoof of the horse.

Letter L, fig. 2, represents a square hole in the snow-plate, through which the clip is inserted when the plate is fastened to the shoe.

Letter M, figs. 1, 2, 3, 4, 5, 6, and 7, represents rivets.

What I claim as my invention, and desire to secure by Letters Patent, is—

The steel toe-cork or sharp, attachable to any smooth horse-shoe by means of a clip, flexible metal straps; also an iron (or other metal) snow-plate, attachable to the shoe by means of the clip and hole and leather loop and strap, as represented in the plan hereunto annexed.

Dated at New York city, the eighth day of November, A. D. 1867.

W. T. HARMAR.

Witnesses:
   J. D. REYMERT,
   JNO. P. HUDSON.